United States Patent [19]

Jussila

[11] Patent Number: 4,831,294

[45] Date of Patent: May 16, 1989

[54] AIR COOLED ELECTROMECHANICAL DRIVE APPARATUS

[75] Inventor: Olavi Jussila, Hyvinkää, Finland

[73] Assignee: Kone Oy, Finland

[21] Appl. No.: 137,143

[22] Filed: Dec. 23, 1987

[30] Foreign Application Priority Data

Dec. 23, 1986 [FI] Finland .................................. 865294

[51] Int. Cl.⁴ .......................... H02K 9/06; H02K 9/18; H02K 15/14
[52] U.S. Cl. ...................................... 310/63; 165/80.3; 310/89; 361/384
[58] Field of Search .......................... 165/47, 53, 80.3; 310/62, 63, 64, 77, 89, 160, 58, 171; 361/384

[56] References Cited

U.S. PATENT DOCUMENTS 3,683,219  8/1972  Kruse ..................................... 310/171
4,096,404  6/1978  Sukhanov et al. .................... 310/77
4,453,114  6/1984  Nordlund ............................. 318/138
4,733,116  3/1988  Schulz ................................. 310/171

OTHER PUBLICATIONS

Hardin, "Integral Edge Connector", IBM Disclosure Bul., vol. 20, No. 11a (Apr. 78), pp. 4346–4348.

Primary Examiner—Patrick R. Salce
Assistant Examiner—D. L. Rebsch
Attorney, Agent, or Firm—Lowe, Price, LeBlanc, Becker & Shur

[57] ABSTRACT

An electromechanical drive has an ac motor provided with a brake, a frequency converter provided with a control unit and supplying the motor, and a transmission gearing connected to the output of the motor. To achieve efficient cooling, the drive is provided with a cooling tunnel housing the motor and the brake; the control unit and the power stage semiconductor switches of the frequency converter are located on the outer walls of this tunnel; and the transmission gear is located in or adjacent the tunnel.

5 Claims, 1 Drawing Sheet

AIR COOLED ELECTROMECHANICAL DRIVE APPARATUS

FIELD OF THE INVENTION

The present invention relates to an electromechanical drive means comprising an ac motor provided with a brake, a frequency converter provided with a control unit and supplying the motor, and a gearing for producing a rotational speed differing from that of the motor.

BACKGROUND OF THE INVENTION

The hoisting motors currently used in hoisting means, such as cranes, are bulky and expensive. The electronic equipment controlling the motor occupies a large space and is placed in separate instrument cabinets. The separate placement of the electronics involves the use of long cables. Moreover, high-power motors require a sizeable brake, which also takes up a large space.

BRIEF DESCRIPTION OF THE INVENTION

It is accordingly an object of the present invention to initiate the drawbacks mentioned.

According to the present invention, an electromechanical drive comprises an ac motor; a brake associated with the ac motor, a frequency converter provided for supplying the motor, the frequency converter comprising power stage semiconductor switches, means for controlling the frequency converter, a transmission gearing connected to the output of the motor, a cooling tunnel housing the motor and the brake, the control means and the power stage semiconductor switches of the frequency converter being located on outer walls of the cooling tunnel, and the transmission gearing being located in or adjacent the cooling tunnel.

In the drive according to the present invention, all heat generating components may be located inside or around the same cooling tunnel. The transmission gearing steps the output speed of the motor to a required level, so that the drive may be substituted for a motor controlled by the mains frequency. Since the frequency converter makes it possible to use a low motor torque, the brake required for the motor may also be small. The drive according to the present invention may be smaller in volume than a normal frequency motor. The same motor can be used within a wide power range, which is of advantage in view of maintenance and spare parts. Furthermore, the cable and wiring connections are short.

A preferred embodiment of the electromechanical drive, according to the present invention comprises fan means for producing an air flow through the cooling tunnel to cool the transmission gearing, the motor, the brake, the power semiconductor switches and the control means.

The preferred embodiment of the electromechanical drive of the invention also comprises cooling ribs provided internally on the cooling tunnel, and the transmission gearing comprises a speed reduction gearing for providing a rotational speed below that of the motor. Tachometer means are associated with the cooling tunnel.

BRIEF DESCRIPTION OF THE DRAWINGS

Further features, objects and advantages of the present invention are described in the following in greater detail by the aid of an example and with reference to the accompanying drawings, in which.

DESCRIPTION OF THE PREFERRED EMBODIMENT

Figure 1:
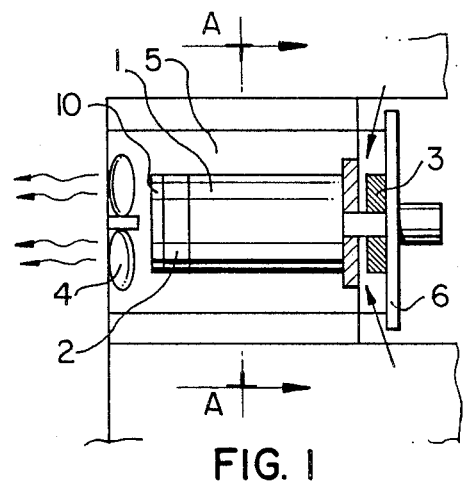
FIG. 1 shows a hoisting motor unit according to the present invention.

The hoisting motor unit shown in FIG. 1, which is intended for use in a crane or the equivalent, comprises a squirrel-cage motor 1 provided with a disc brake 2. The squirrel-cage motor 1 is coupled to a reduction gearing 3 to produce a lower rotational speed. The motor 1 is located in a cooling tunnel 5, the brake 2 being mounted on the motor 1. For improved air circulation, indicated by arrows in FIG. 1, the cooling tunnel 5 is provided with a fan 4. As shown in FIG. 1, the reduction gearing 3 is located at the mouth of the tunnel 5. The gearing is mounted on a flange 6 by which the hoisting motor unit 1 is attached to a crane or the equivalent.

Figure 2:
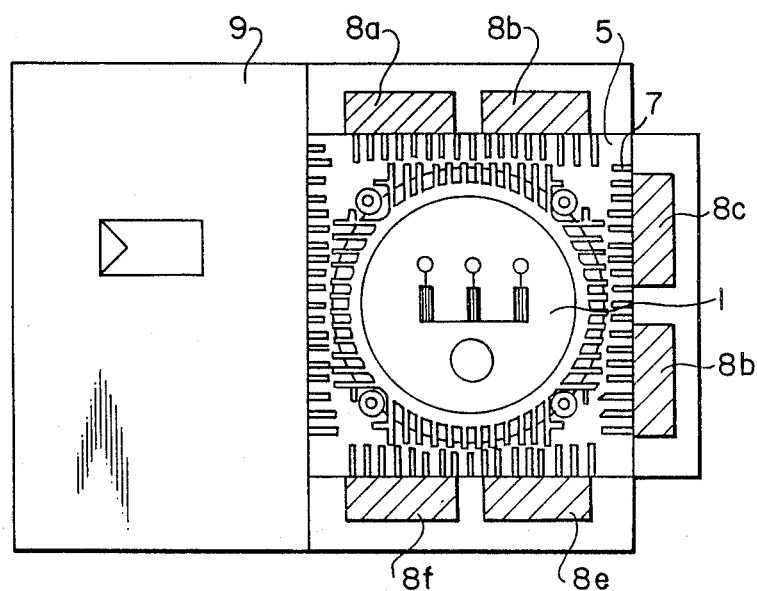
FIG. 2 shows the hoisting motor unit of FIG. 1 taken in section along the line A—A of FIG. 1.

FIG. 2 shows a section through the hoisting motor unit taken along line A—A in FIG. 1. The tunnel 5 is provided with internal cooling ribs 7 for improved cooling efficiency. The cooling ribs may be made e.g. of extruded sectional aluminium. The cooling ribs 7 provide a large cooling surface. The frequency converter, which consists of a power stage and a control unit, supplies the motor with a frequency exceeding the mains frequency, e.g. 70–300 Hz or above. The power available from the motor increases in proportion to the frequency. Thus, at a frequency of 300 Hz the motor yields a power about six times that obtained at a frequency of 50 Hz. Using the reduction gearing 3 as shown in FIG. 1, the speed of rotation is reduced to within the range of 1000–1500 r.p.m. which is the standard speed range of a squirrel-cage motor operated from a 50 Hz or 60 Hz mains supply. Thus, the hoisting motor unit is interchangeable with a mains-operated squirred-cage motor. As shown in FIG. 2, the control unit 9 and the power transistors 8a–8f of the power stage of the frequency converter are mounted on the external walls of the cooling tunnel 5, the control unit 9 being located on one wall and the transistors 8a–8f of the three-phase frequency converter on the other three walls.

In addition to the brake 2, a tachometer 10 may be mounted on the motor to provide speed feedback. When the reduction gear 3 is placed as shown in FIG. 1 in the vicinity of the mouth of the tunnel 5, all heat generating components are located close to the cooling tunnel, the result being a concentrated cooling system that efficiently cools the transmission gearing 3, the motor 1 and the brake 2, as well as the power stage and control unit 9 of the converter. A stepless speed control system, rendered possible by the use of a frequency converter, is thus located in the same unit with the motor 1.

It will be obvious to those skilled in the art that the embodiments of the invention are not restricted to the example discussed above, but that they may instead be varied within the scope of the following claims.

I claim:

1. An electromechanical drive comprising:
an a.c. motor;
a brake associated with said a.c. motor;

a frequency converter provided for supplying said motor;
said frequency converter comprising power stage semiconductor switches;
means for controlling said frequency converter;
a transmission gearing connected to the output of said motor;
a cooling tunnel housing said motor and said brake;
said control means and said power stage semiconductor switches of said frequency converter being located on outer walls of said cooling tunnel; and
said transmission gearing being located in or adjacent said cooling tunnel.

2. An electromechanical drive according to claim 1, further comprising fan means for producing an air flow through said cooling tunnel to cool said transmission gearing, said motor, said brake, said power semiconductor switches and said control means.

3. An electromechanicl drive according to claim 1, further comprising cooling ribs provided internally on said cooling tunnel.

4. An electromechanical drive according to claim 1, wherein said transmission gearing comprises a speed reduction gearing for providing a rotational speed below that of said motor.

5. An electromechanical drive according to claim 1, further comprising tachometer means associated with said cooling tunnel for providing speed feedback.

* * * * *